United States Patent [19]

Meyer

[11] 3,910,627
[45] Oct. 7, 1975

[54] SUN VISOR BLADE AND CLIP ASSEMBLY
[75] Inventor: Engelbert A. Meyer, Union Lake, Mich.
[73] Assignee: USM Corporation, Boston, Mass.
[22] Filed: Mar. 18, 1974
[21] Appl. No.: 451,776

[52] U.S. Cl............ 296/97 H; 16/128 R; 296/97 K; 403/165; 403/365
[51] Int. Cl.²......................................... B60J 3/00
[58] Field of Search.............. 296/97 K, 97 J, 97 H; 16/136, 128 R, 128 A, 171, DIG. 27; 403/361, 120, 165, 365

[56] References Cited
UNITED STATES PATENTS
| | | | |
|---|---|---|---|
| 2,153,950 | 4/1939 | Whinery | 403/361 X |
| 2,529,219 | 11/1950 | Kost | 403/361 |
| 3,035,864 | 5/1962 | Davidson | 296/97 K |
| 3,649,070 | 3/1972 | Hoyer | 296/97 H |

FOREIGN PATENTS OR APPLICATIONS
| | | | |
|---|---|---|---|
| 971,057 | 1/1951 | France | 296/97 |
| 1,955,674 | 11/1968 | Germany | 296/97 H |

Primary Examiner—Robert J. Spar
Assistant Examiner—Donald W. Underwood
Attorney, Agent, or Firm—Vincent A. White; Richard B. Megley

[57] ABSTRACT

A visor blade of molded, collapsible truss formation is provided which features both safety and reliable position-holding capability. The latter is attained by a clip blanked from sheet metal and of a configuration to be anchored in a hinge portion of the visor, and tensionally grip a mounting rod to uniformly resist turning of the visor from any selected angular position about the rod.

7 Claims, 6 Drawing Figures

U.S. Patent  Oct. 7,1975  3,910,627
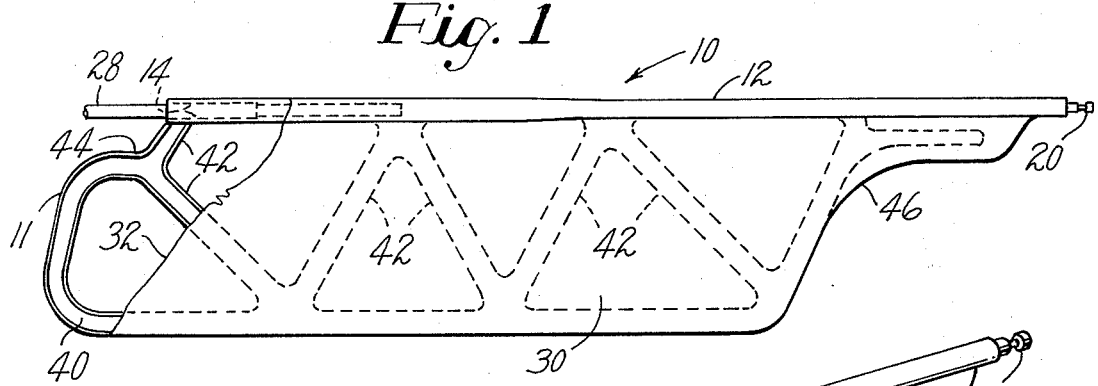
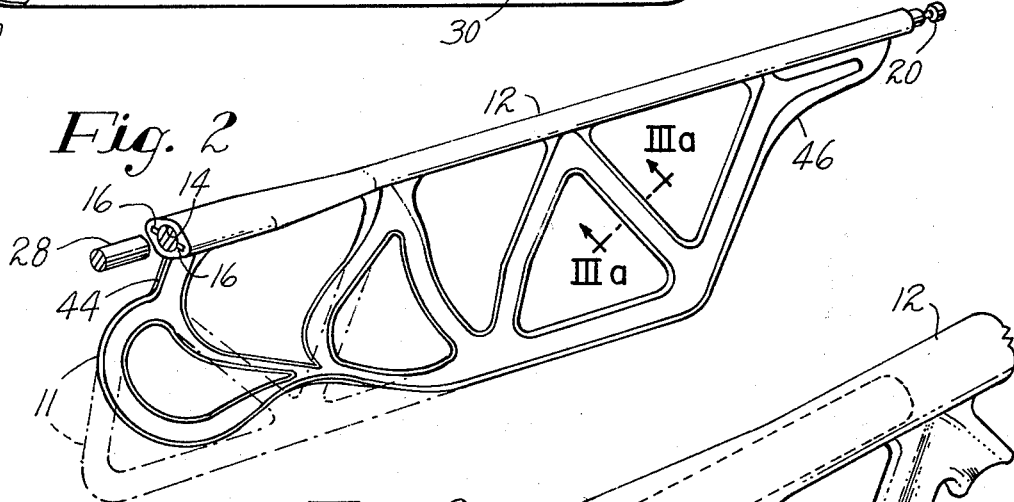
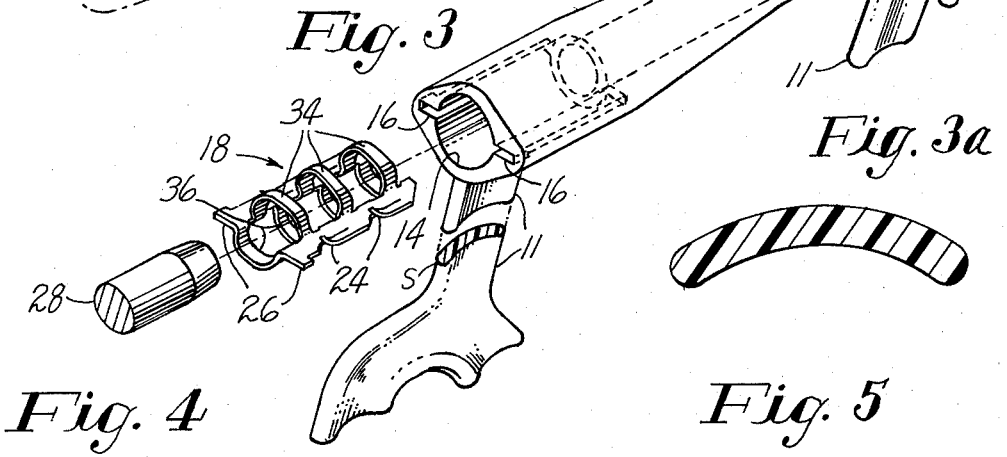
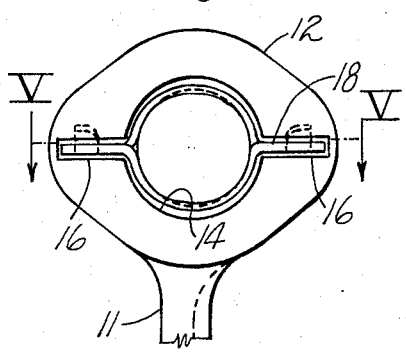
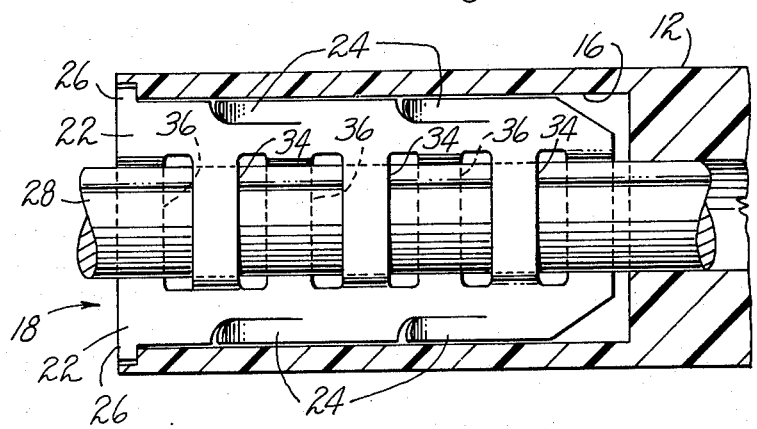

SUN VISOR BLADE AND CLIP ASSEMBLY

BACKGROUND OF THE INVENTION

This invention relates to vehicle visor assemblies.

Sun visors of the type generally installed in motor vehicles above wind shields commonly have an annoying trait: they often fail to hold the selected position of adjustment to which they are swung for effectively blocking sun rays or the head beams of on-coming vehicles. Moreover, they may, after some useage, fail to stay in their normal out-of-the-way inoperative position and hence tend to obstruct vision or otherwise become a nuisance.

Visors have commonly comprised a flat portion or blade contoured to provide a movable mask, and a hinge portion extending along a longitudinal edge of the flat portion. One end of the hinge portion has ordinarily been formed to receive a pivotal carrier rod, and the other end adapted to be secured in latching position in front of and/or to one side of a vehicle occupant. Frequent and often sudden shifting of the blade, both angularly about the pivot axis at one end of the rod and about the longitudinal axis of the rod itself to meet changing circumstances tends to render the frictional operative holding relation of the carrying rod and the blade inconstant and unreliable.

A further disadvantage in vehicle visors is that, although their blade portions, often of laminar wood or cardboard, may be covered as by a flocculant or fabric, they are apt to be harmful in the event of vehicle accident since they may well be impacted by the heads of passengers and are inadequately yieldable to cushion a blow.

SUMMARY OF THE INVENTION

In view of the foregoing it is an object of this invention to provide an improved visor assembly mountable on a carrier rod and capable of frictionally retaining any adjusted position of angularity.

Another object of the invention is to provide an adjustable vehicle visor assembly, the molded blade of which is shaped to facilitate at least partial yielding or collapse in the event of an impact therewith, but which otherwise exhibits adequate resistance to deformation during manual operation thereof to overcome restraint maintaining the blade in a selected position.

To these ends, and as herein illustrated, a visor assembly comprises an integral, molded plastic body, including a substantially rigid hinge portion extending along one side thereof, one end of the hinge portion being axially tubular, and a sheet metal clip extending in the tubular hinge portion and having laterally projecting means engageable with the wall of said hinge portion to prevent relative rotation of the clip, the clip including axially spaced arcuate bearing bands, and a mounting rod arranged to be received in frictional engagement with the inner walls of the bands. Preferably, as shown herein the visor includes a planar blade portion extending laterally along one side of the hinge portion, the blade portion being generally of parallelogram configuration and having an open or skeletal web-like frame structure consisting of angularly interconnecting members and an outer margin, the cross sections of which are concavo-convex. These molded light-weight members thus are individually bendable lengthwise but transversely rigid, and hence provide a unitary visor blade capable of buckling upon accidental impact.

BRIEF DESCRIPTION OF THE DRAWINGS

The foregoing and other features of the invention will now be more particularly described in connection with an illustrative embodiment and with reference to the accompanying drawings thereof, in which:

FIG. 1 is a view in side elevation of a sun visor assembly, its upper or hinge portion being horizontal and its blade portion being suspended therefrom and having its cover partly broken away to reveal its novel frame;

FIG. 2 is a perspective of the assembly shown in FIG. 1, without its cover, full lines now illustrating partial deformation resulting from an accidental impact;

FIG. 3 is an enlarged exploded perspective of a mounting end of the visor, configuration of a relaxed friction clip and typical cross section of a blade member being shown;

FIG. 3a is an enlarged section taken on the line IIIa-IIIa in FIG. 2;

FIG. 4 is an end view showing a mounting rod received in the installed friction clip, and FIG. 5 is an enlarged axial section showing mounting of the clip and rod.

DESCRIPTION OF THE PREFERRED EMBODIMENT

FIG. 1 shows a visor blade and clip assembly generally designated 10. It comprises a unitary frame 11 of plastic molded to provide a desired, for instance parallelogram, configuration. Along the longer, upper side of the assembly there extends a rigid hinge portion 12 (FIGS. 1 – 4) having at its tapering larger end an axial bore 14, preferably formed with opposed axial slots 16,16 (FIGS. 2,3) for a purpose later mentioned. The bore 14 is sized to receive and rotationally anchor a friction clip 18 (FIGS. 3 – 5) to be more fully described. The other end of the hinge portion 12 may be formed with a reduced socket 20 for releasably and pivotaly securing the visor in a latch (not shown) mounted, for instance, above the windshield of a vehicle.

The clip 18 is preferably formed from a sheet metal blank of roughly about 0.020 gauge. Opposite margins 22,22 of the blank remain generally in a plane and are to be thrust axially into the slots 16,16 respectively. Tangs 24 (FIGS. 3–5) stuck from the margins 22 are provided to resist retraction of the clip from the bore 14. The margins 22 and end tabs 26,26 fitted in an end of the hinge portion thus prevent relative rotation of the clip in the visor when the latter is turned about its hinge axis, i.e., the axis of a cylindrical carrier or mounting rod 28 (FIGS. 3 and 5). This rod 28 has a leading end which may be beveled to be telescoped in the clip 18 as will be explained and an opposite end (not shown) is secured to a universal joint or other suitable means permitting the rod to be swung in such direction as it is desirable manually to orient the rod and the visor.

For enabling a planar blade portion 30 of the visor frame 11, which may be covered with fabric, plastic or other suitable soft material 32, to be swung about the axis of the carrier rod 28 and then held in any selected position, the clip 18 includes endless or closed, substantially semi-elliptoidal bearing bands 34,36 (when relaxed as in FIG. 3) pressed from opposite sides of the original blank. These bands preferably are axially spaced uniformly and alternately project from opposite sides. Inner opposed minor radii of these relaxed bands 34,36 are slightly less than the radius of corresponding portions of the rod 28 and predetermined to provide tension when distended on the circumference of the rod 28. Their frictional gripping engagement therewith, in sum, consistantly enables the visor portion to be angularly held as intended. Whereas prior designs have in time, through parts loosening or vibrations and the like, allowed a visor blade to fail to keep some angular settings and even to never retain other selected angular positions, the tensioning of the distended bands 34,36 engaging the rod 28 provides holding friction which is adequate and substantially uniform at all desired angular settings of the visor. Obviously fewer or more bands 34,36 which have no free ends to allow permanent deflection from gripping relation, may be employed as desired.

The planar blade portion 30 of the frame 11 desirably comprises, within the cover 32, a skeletal web-like structure of an outer margin 40 and interconnecting members 42. These are uniformly thin and light-weight, the members 42 intersecting near or substantially at the hinge portion 12 and at the opposite margin 40 of the parallelogram. As indicated at 44,46 (FIGS. 1,2) a "corner" portion may be cut away, in effect, to permit requisite clearance for a mirror or the like. Preferably for reinforcing purposes one of the members 42 terminates at a corner of the parallelogram. More particularly two or more of the members 42 are parallel and intersect at their junctions with the longer sides of the parallelogram at similar acute angles. To provide appropriate strength for rendering the visor repeatedly maneuverable and yet permit it to buckle on impact, i.e., be deformed out of its generally planar shape, for example as shown in FIG. 2, each of the members 42 and the margin 40 has a shallow concavo-convex transverse cross-section substantially as indicated in FIG. 3a and also designated S as shown in FIG. 3; generally similar longitudinal shaped sections, though somewhat longer, are formed at the intersections of the members 40,42 and 12,42. The members 40,42 may have a thickness, for instance, of about one-eighth of an inch and preferably have rounded rather than sharp edges. Openings defined by the members 40,42 are generally triangular and constitute a large percentage of the overall area of the blade portion 30.

It will be appreciated from the foregoing that the invention provides a visor blade and clip assembly of simple structure which is relatively economical to manufacture. The clip 18 and unitary molded frame 11 when assembled are turned as one about the axis of the carrying rod 28 to position the visor blade portion 30 as desired. Frictional gripping of the distended bands 34,36 with the circumference of the rod 28 assures that all adjusted angular positions of the visor blade will be held. Moreover, yieldability in the concavo-convex shape of the visor blade web members 42 and of the margin 40 assures that accidental impact of the head for instance, of an occupant of the vehicle will collapse the visor at least partly and thereby assist in reducing and possibly avoiding serious injury.

Having thus described my invention, what is new and desired to be secured by Letters Patent of the United States is:

1. A visor assembly for mounting on a carrier rod, the assembly comprising a body having a circumferentially rigid hinge portion and a distortable visor planar portion integrally extending along one side thereof, an end of the hinge portion having an axial bore slightly larger in diameter than the diameter of the rod, and a clip nonrotatably mounted in the bore, said clip including two or more axially spaced non-circular bands each end of each band merging into and being integral with an opposite side of the clip, said bands formed to be distended in tension about the circumference of the rod and to frictionally engage and grip said rod.

2. An assembly as in claim 1 wherein the clip is of sheet metal, said bands being uniformly spaced and alternately struck from opposite sides of the sheet metal to provide semi-elliptoidal inside frictional bearing surfaces sized to be distended into tensional gripping relation with opposite portions of the circumference of the rod.

3. An assembly as in claim 2 wherein the rod is cylindrical, and the bands, before and after distention by the rod, are of substantially uniform size and shape, their minor radii prior to distention being less than the radius of the rod.

4. An assembly as in claim 1 wherein the clip, which has a length less than one-third that of the rod, is of sheet metal and longitudinally extending opposite margins thereof are seated in axial slots respectively extending in opposite sides of said bore wall.

5. A visor assembly as in claim 2 wherein the visor assembly is a molded plastic assembly for adjustable angular mounting on the rod the hinge portion being of substantially rigid elongated form adapted to axially receive the rod and be pivotally moved between selected angular positions, and the distortable visor planar portion being a skeletal blade portion of generally parallelogram configuration and including generally triangular openings defined by distortable strut members angularly connected and integral with the hinge portion.

6. A visor assembly as in claim 5 wherein the clip is fixedly secured to the hinge portion and adapted to exert a circumferential tensioning grip on the rod at spaced positions along less than one-third of its length to restrain the assembly against relative rotation on the rod.

7. A visor assembly as in claim 5 wherein said members have a concavo-convex cross section of substantially uniform thickness, and the margins of the parallelogram are likewise concavo-convex in cross section to provide stiffness in their general plane and be distortable out of said plane.

* * * * *